United States Patent [19]
Viel Lamare et al.

[11] Patent Number: 5,911,956
[45] Date of Patent: Jun. 15, 1999

[54] METHOD OF PURIFYING GASES CONTAINING NITROGEN OXIDES AND AN APPARATUS FOR PURIFYING GASES IN A STEAM GENERATION BOILER

[75] Inventors: Charles Viel Lamare; Matti Hiltunen, both of Karhula, Finland; Yam Lee, San Diego, Calif.

[73] Assignee: Foster Wheeler Energia Oy, Finland

[21] Appl. No.: 08/979,308

[22] Filed: Nov. 26, 1997

Related U.S. Application Data

[60] Continuation of application No. 08/453,884, May 30, 1995, abandoned, which is a division of application No. 08/226,483, Apr. 12, 1994, Pat. No. 5,465,690.

[51] Int. Cl.⁶ .................................................. B01D 50/00
[52] U.S. Cl. ........................ 422/177; 422/171; 422/172; 422/173; 422/198; 422/200; 422/109; 422/110; 110/245; 122/4 D
[58] Field of Search .................................... 422/168, 172, 422/171, 177, 198, 200, 211, 201, 110, 109; 110/245, 345; 122/4 D; 423/235, 239.1; 165/39–40, 921

[56] References Cited

U.S. PATENT DOCUMENTS

| | | | |
|---|---|---|---|
| 2,078,947 | 5/1937 | Houdry et al. | 422/200 |
| 2,078,948 | 5/1937 | Houdry | 422/200 |
| 3,900,554 | 8/1975 | Lyon | 423/235 |
| 4,129,651 | 12/1978 | Kolke et al. | 423/235 |
| 4,181,705 | 1/1980 | Gumerman | 423/235 |
| 4,208,386 | 6/1980 | Arand et al. | 423/235 |
| 4,393,031 | 7/1983 | Henke | 423/239 |
| 4,978,514 | 12/1990 | Hofmann et al. | 423/235 |
| 4,981,660 | 1/1991 | Leach | 423/235 |
| 5,048,432 | 9/1991 | Hofmann et al. | 423/235 |
| 5,133,950 | 7/1992 | Oakes et al. | 423/239 |
| 5,139,754 | 8/1992 | Luftglass et al. | 423/235 |
| 5,233,934 | 8/1993 | Krigmont et al. | 423/235 |
| 5,237,939 | 8/1993 | Spokoyny et al. | 423/235 |
| 5,286,467 | 2/1994 | Sun et al. | 423/235 |
| 5,300,270 | 4/1994 | Krigmont et al. | 423/235 |
| 5,304,362 | 4/1994 | Madsen | 423/235 |
| 5,318,755 | 6/1994 | Kuivalainen et al. | 422/171 |
| 5,407,649 | 4/1995 | Anderson et al. | 431/7 |
| 5,555,849 | 9/1996 | Wiechard et al. | 122/4 D |

FOREIGN PATENT DOCUMENTS

| | | |
|---|---|---|
| 0176293 | 4/1986 | European Pat. Off. . |
| 0 583 771 A1 | 2/1994 | European Pat. Off. . |
| 3615705 | 11/1987 | Germany . |
| 3721051 | 1/1989 | Germany . |
| 58-60194 | 4/1983 | Japan ..................................... 165/921 |
| WO 90/09228 | 8/1990 | WIPO . |

OTHER PUBLICATIONS

"Clean Coal Today", Issue No. 7, Summer 1992, Office of Fossil Energy, U.S. Dept of Energy.

*Primary Examiner*—Hien Tran
*Attorney, Agent, or Firm*—Nixon & Vanderhye P.C.

[57] ABSTRACT

A method of reducing the nitrogen oxide level in the flue gases issuing from combustion units by introduction of reducing agents into contact with gases containing nitrogen oxides in first and second reducing stages, is provided. The first reducing stage is a non-catalytic stage (e.g. at temperatures over 800° C.), while the second stage is a catalytic stage (e.g. at temperatures of about 300–400° C.). A steam generation boiler with improved nitrogen reduction facilities is also provided. The amount of nitrogen oxides in the hot gases is reduced in the combination of the first and second reducing stages while producing steam in a steam generation boiler system, thus resulting in gases essentially free from nitrogen oxides while eliminating the possibility of $NH_3$ (or other reducing agent) slip in the exhausted flue gases. Heat transfers in a convection section as used to establish stabilized temperature conditions for catalytic reduction.

12 Claims, 1 Drawing Sheet

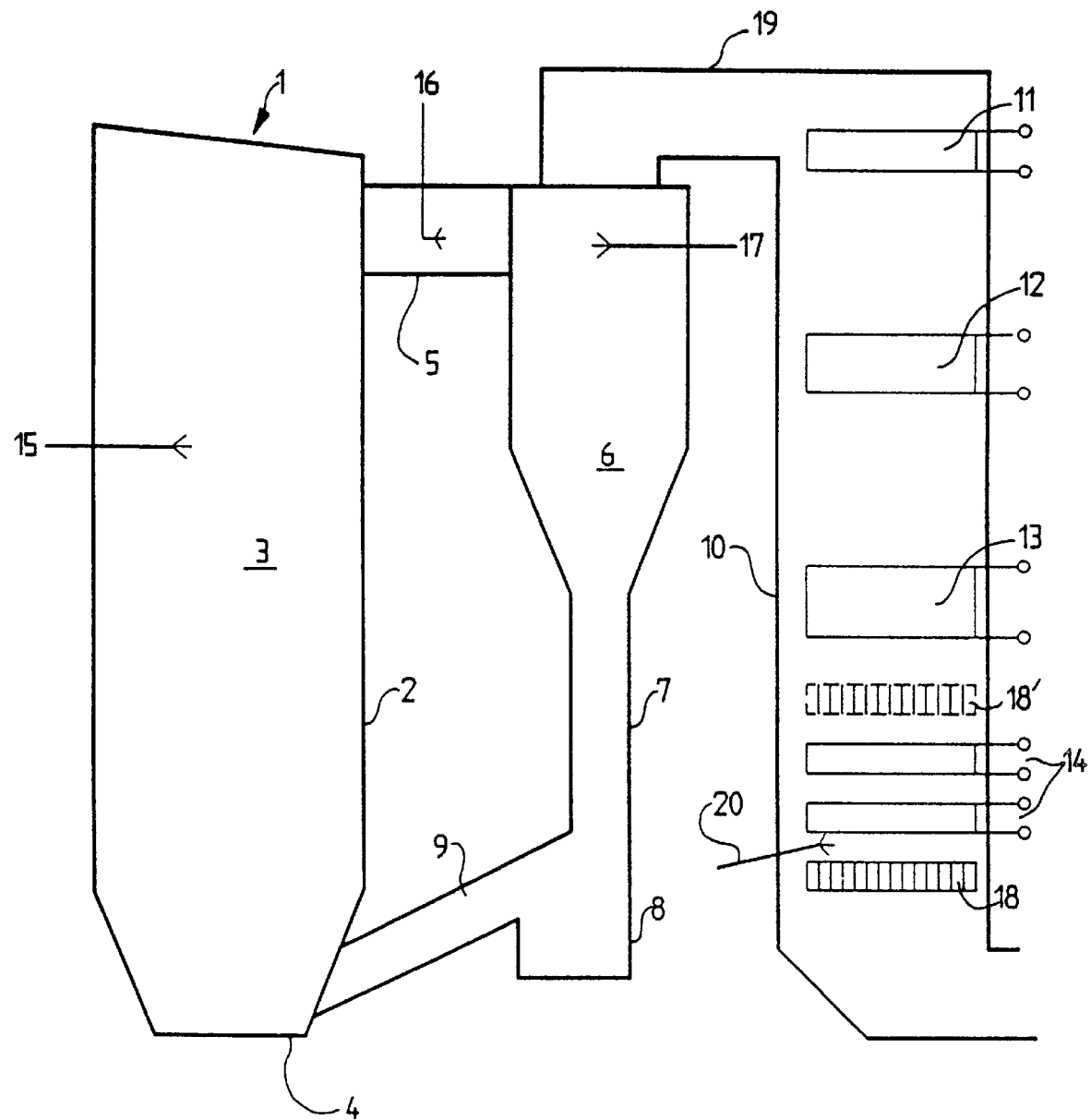

METHOD OF PURIFYING GASES CONTAINING NITROGEN OXIDES AND AN APPARATUS FOR PURIFYING GASES IN A STEAM GENERATION BOILER

This is a continuation of application Ser. No. 08/453,884, filed May 30, 1995, now abandoned, which in turn is a divisional of Ser. No. 08/226,483 filed Apr. 12, 1994, now U.S. Pat. No. 5,465,690.

BACKGROUND AND SUMMARY OF THE INVENTION

The present invention relates to a method of reducing the nitrogen oxide level in the flue gases issuing from combustion units and, more particularly, to the reduction of $NO_x$ levels by introduction of reducing agents into contact with gases containing nitrogen oxides, and to the finalization of the reduction by bringing the gas into catalytic reduction. The present invention also relates to a steam generation boiler with improved nitrogen reduction facilities.

The invention relates to method of lowering the nitrogen oxides content of the flue gases emanating from the reactions of substantially any combustible fuel, including solid fuels, sludges, gaseous fuels, or the like. In particular, the invention provides an improved fluidized bed combustion process, in which the effluent stack gases can be managed economically to meet the current environmental standards.

Reduction of nitrogen oxides emissions from the exhaust gases or flue gases before they are released into the atmosphere has been a prolific topic of discussion in the field of environmental aspects of energy production by combustion of fuel material. Because $NO_x$ emissions are related to various environmental problems, the minimization of $NO_x$ release from combustion systems is an ongoing concern.

It is evident that nitrogen oxide emissions result from any combustion reaction where air is present and/or the fuel used contains nitrogen. Fluidized bed combustion of fuel is a well known practice and found to be beneficial in reducing nitrogen oxide emissions due to its relatively low operating temperature. In fluidized bed combustion, air is typically introduced through a plenum where it is distributed through an air distribution grid. Fuel, fluidizing solids, and possibly sorbents such as limestone or dolomite, are fluidized and they react in the furnace at temperatures normally in the range of about 700–1200° C. Nitrogen oxides are generated in burning of any fuel as a result of thermal fixation of nitrogen in the air and the conversion of fuel nitrogen. The former reaction is favored at high temperatures (above about 950° C.) while the latter is of greater concern at lower temperatures, e.g., those generally found in fluidized bed combustion systems.

U.S. Pat. No. 3,900,554 suggests non-catalytic removal of nitrogen oxides from the flue gases which have exited a conventional furnace, by injecting ammonia ($NH_3$) into the effluent stream while it is at a temperature of about 871–1093° C. (i.e. about 1600–2000° F.). European patent publication 176,293 also discloses use of $NH_3$ for $NO_x$ control via ammonia injection into a flue gas stream prior to its entry into a centrifugal separator. Many other patents have suggested use of ammonia with a catalyst, so that the ammonia is injected into the gases prior to catalytic reduction. U.S. Pat. No. 4,393,031 suggests injection of ammonia into the gases and, after mixing the gas with ammonia, passing of the mixture through a catalytic reactor.

The methods suggested by the prior art are advantageous but still may have several shortcomings. Non-catalytic reduction of $NO_x$ by injecting ammonia into flue gases has a limited capacity to reduce nitrogen oxide emissions, while the molar ratio of $NH_3/NO_x$ may increase to such a high level that "$NH_3$ slip" will emerge. This causes undesirable ammonia emissions with the flue gases into the atmosphere, as well as possible binding of ammonia in ashes. The suggested method of injecting ammonia into the gas prior to its contact with catalyst has better reducing capabilities. However, catalytic nitrogen oxide reduction requires a large amount of catalyst. As a result, high space-consuming vessels are needed to support the catalyst layers. In commercial scale plants, this kind of catalyst vessel may normally be even higher than 7–10 m. Substantial pressure losses will also take place in this kind of reduction systems.

According to the present invention a method of reducing nitrogen oxide emissions into the atmosphere from a combustion process is provided in which efficient reduction is achieved and the shortcomings of the prior art methods discussed above are overcome. According to the present invention a method of reducing $NO_x$ emissions from a combustion steam generation process is provided in which efficient reduction is achieved with a compact size steam generator. According to the present invention a method of reducing $NO_x$ emissions from a combustion process by efficient $NO_x$ reduction in catalytic treatment is provided in which the pressure losses are low, typically less than about 400 Pa.

The present invention also comprises a fluidized bed steam generation boiler system with better reduction facilities for $NO_x$ emissions than in the prior art, and in which efficient reduction is achieved with a compact size fluidized bed reactor.

According to one exemplary method of the present invention a method of purifying combustion gases from a steam generation boiler system, which comprises a fuel reaction chamber and a flue gas convection section operatively connected to the reaction chamber, having heat transfer elements for extracting heat from the gases, is provided. The method comprises the steps of: (a) maintaining combustion reactions in the reaction chamber resulting in the production of hot gases containing nitrogen oxides; (b) discharging the hot gases from the reaction chamber and leading them into the convection section; (c) cooling the gases in the flue gas convection section; (d) reducing nitrogen oxides in a first reducing stage by bringing the hot gases into contact with a reducing agent; and then (e), reducing nitrogen oxides in a second reducing stage by subjecting the gases containing the reducing agent of the first reducing stage to a catalytic $NO_x$ reduction in the flue gas convection section.

The invention also relates to a steam generation boiler system which includes the following elements: A fuel reaction chamber and a flue gas convection section operatively connected to the reaction chamber. The convection section has heat transfer elements for extracting heat from flue gases. Means are provided for introducing reducing agent into the flue gases in the reaction chamber; and catalytic nitrogen oxide reducing means are provided in the convection section on the opposite side of the introducing means from the reaction chamber.

The invention also relates to a method of purifying combustion gases from a fluidized bed steam generation plant which includes a fluidized bed reaction chamber, a particle separator connected to the reaction chamber, and a flue gas convection section connected to the particle separator and having heat transfer elements for extracting heat from the gases. This method comprises the steps of: (a)

maintaining combustion reactions in a fluidized bed of solids in the fluidized bed reaction chamber, resulting in the production of hot flue gases; (b) discharging the hot gases and particles entrained therewith from the reaction chamber and leading the gases and particles into the particle separator; (c) separating particles from the gases in the separator; (d) in a first reducing stage, bringing the hot gases into contact with a reducing agent which effects reduction of the $NO_x$ content of the gases under non-catalytic conditions; (e), conveying the flue gases into the flue gas convection section, and cooling the gases therein; and, (f) in a second reducing stage, subjecting the gases containing the reducing agent of the first reducing stage to a catalytic $NO_x$ reduction in the flue gas convection section after the practice of step (e).

The amount of nitrogen oxides in the hot gases is reduced according to the present invention in a combination of two stages disposed in series, while producing steam in a steam generation boiler system, thus resulting in gases essentially free of nitrogen oxides and eliminating the possibility of $NH_3$ (or like reducing agent) slip in the exhausted flue gases. The present invention utilizes heat transfer surfaces in a convection section to establish stabilized temperature conditions for catalytic conversion.

According to the present invention, $NO_x$ reducing agent, preferably ammonia, is injected into the hot combustion gases in the reaction chamber, and/or in a section connecting the reaction chamber and the convection section, at a temperature >800° C. This effects non-catalytic reduction of nitrogen oxides in the hot gases. Injection into the locations described above causes no additional pressure losses. According to the invention, it is preferable to adapt the injection location(s) to the steam generation load of the plant, thus ensuring that an optimum injection temperature and retention time of ammonia are maintained in the first stage of reduction, in all operating conditions of the fluidized bed steam generation boiler system.

The gases—which still contain nitrogen oxides and ammonia—are caused to pass the heat transfer surfaces in the convection section of the steam generation plant, thereby lowering the temperature of the gases. After having been cooled to a temperature of about 300–500° C., the gases are introduced into the second reduction stage for catalytic reduction of nitrogen oxides. In the second stage the ammonia previously injected into the hot gases is present, and essentially no additional reducing agent is needed in normal operation. The temperature is selected according to the requirements of the catalyst used and, once selected, the temperature must be maintained stable within certain limits for ensuring that reduction takes place. According to the invention, it is preferable to cool the gases to the selected temperature, which is typically in the range of about 300–500° C., by appropriate heat transfers in the convection section before the catalytic treatment. In this manner the temperature of catalytic treatment may be stabilized, and also preferably maintained in the second stage within the range of about ±25° C. of the optimum working temperature of the catalyst used. The stable temperature conditions are readily maintained by regulating the flow rate of the heat transfer medium at least in a heat exchanger preceding the catalyst in the convection section. This is preferably performed according to the load of the steam generator, thereby always obtaining an optimum working temperature of the catalyst, with varying loads of the plant.

Since the major portion of reduction has taken place in the first reduction stage, the catalyst in the second stage is preferably disposed in connection with the convection section, most preferably inside the convection section after the heat transfer surfaces. The dimension of the catalyst layer according to the present invention is so small that it may be disposed in an appropriate location in the convection section, so that the temperature of the catalyst may be maintained at its optimum operating level. It has been found that the required reduction of nitrogen oxides results if the gases are disposed to flow through the catalyst over a linear flow distance of less than about 2 m (e.g. less than 1 m) in a commercial size plant. Thus, according to the present invention, much less catalytic surface is required than in the prior art methods. Consequently, pressure losses are smaller. The catalyst required by the present invention results in pressure losses which are at least 50% less than in prior art methods (e.g. less than about a 400 Pa pressure reduction). This results in considerable savings in operating costs, while still providing adequate $NO_x$ reduction without excessive ammonia slip.

Under some operating conditions, such as a low load, there may be an excess of injected ammonia after the first reduction stage. In such cases the second reduction stage, according to the invention, while reducing the nitrogen oxide emissions, simultaneously removes the gaseous $NH_3$ slip from the gases. This makes the present invention with two reducing stages even more attractive. It is possible to inject such amounts of ammonia that the reduction is at its maximum without a risk of a harmful $NH_3$ slip and its entrainment into atmosphere with the exhausted flue gases.

It should be understood that any known nitrogen reducing agent may be utilized in connection with the present invention, but preferably the reducing agent is selected from the group essentially consisting of amine-containing agent, ammonia or urea, or ammonia producing precursor.

BRIEF DESCRIPTION OF THE DRAWING

FIG. 1 depicts a circulating fluidized bed steam generation plant provided with $NO_x$ reducing facilities according to the present invention.

DETAILED DESCRIPTION OF THE DRAWING

FIG. 1 illustrates a power plant system embodying a typical circulating fluidized bed steam generation boiler system with superheaters and an economizer, with the system incorporating the present invention. The boiler system, designated generally by the reference numeral 1, comprises a fluidized bed combustor 2 having a combustion chamber 3 into which combustible material, non-combustible material, additional additives or recirculated material, primary air, and secondary air are fed. In the combustion chamber 3, the bed is maintained in a fluidized state by having the correct inventory of bed material and the desired flow of air. The combustion chamber 3 is provided with a bottom 4 having a grid-like construction through which fluidizing air is introduced. The combustion chamber walls are preferably conventional membrane type tube walls serving as steam generation surfaces, with or without a refractory covering.

The combustion chamber materials (particles/solids) are carried from the combustion chamber 3 by hot exhaust gases via conduit 5 to a hot particle separator 6 (typically a cyclone separator), wherein the solids are separated from the gases for return by way of particle recycling system 7, 8 and 9 to the lower section of the combustion chamber 3 for reuse in the bed. The recirculated particles may be passed through fluidized bed coolers or the like (not shown) prior to return to the combustion chamber 3.

The details of the circuit for the feed water, steam generation and the superheaters are not illustrated as they do not form an essential part of the present invention, being conventional.

For reducing the nitrogen oxide content of the hot gases in a first reduction stage, reducing agent—preferably $NH_3$—is injected via nozzles 15, 16 and/or 17 into the gases where the gases are at a temperature >800° C. At such temperature the reducing reactions between $NO_x$ and $NH_3$ take place non-catalytically, and thus no large volume consuming separate, large catalyst beds is needed. The location of the injection points 15–17 may be controlled according to the load of plant, so that an optimum temperature and retention time for non-catalytic reduction of $NO_x$ is obtained. A critical factor for effective reduction is efficient mixing of the ammonia with the hot gases. Therefore, the nozzles at locations 16 or 17 provide results due to efficient mixing in the cyclone separator 6. The $NO_x$ content of the gases is significantly lowered in the first reducing stage by ammonia injection, $NO_x$ content preferably being reduced to a level below about 60 ppm.

Flue gases from the separator 6 pass through a conduit 19 to a convection section 10 where the first reduction stage is practiced. A superheater stage 11 may be positioned in the convection section 10 with, e.g., reheaters 12 and 13 located downstream of superheater 11 and upstream of economizer surfaces 14. The selection of necessary heat transfer structures upstream of the economizer surfaces 14 depends upon the particular fuels, reducing agents, and other variables. The gases, while passing over the heat transfer structures (superheater and reheaters) 11, 12 and 13, cool and pass through the economizer surfaces 14.

After passing the economizer surfaces 14 the gases are led to a second reduction stage according to the invention. In the second reduction stage the gases are subjected to a catalytic reduction in the presence of a reducing agent from the first reducing stage. The catalyst bed or section 18 in the second reducing stage finalizes the reduction, the amount of nitrogen oxides after the second stage being at a generally acceptable level, preferably below about 20 ppm.

The required amount of catalyst in the second stage is very small, being thereby directly adaptable to the convection section 10 of the boiler system 1. The linear length of the catalyst section 18, i.e. the passage for gases to flow through the catalyst section 18, is less than about 2 m, preferably less than 1 meter (or if more than one bed 18 is provided the total linear passage length is less than 2 meters). Typical catalysts that may be used in catalyst section/bed 18 include $V_2O_5$ catalysts, or CuO catalysts. This results in practically no additional pressure losses in the second reduction stage, the pressure loss in the catalyst section 18 being less than about 400 Pa, preferably <200 Pa. Thus, the present invention provides adequate nitrogen oxide reduction with practically no significant pressure loss, contrary to prior art methods, which may result in pressure losses twice as high as the present invention.

To ensure proper functioning of the second reduction stage the temperature of the gases entering the catalyst section 18 is stabilized and maintained at a desired level by influencing the flow rate of the feed water to the economizer 14. The optimum reduction temperature for this illustrative embodiment and commercially available $V_2O_5$ catalyst is 300–400° C. In case a catalyst is used which has its optimum working temperature above 400° C., it is preferably disposed before the economizer 14, or between the first and second economizer surfaces 14 in the convection section 10. At a temperature of about 500° C. zeolite catalysts are preferred. According to the invention, it is possible to position the catalyst section 18 always at its optimum working temperature by selecting a proper location in the convection section 10 and, further, to have the temperature maintained within the operative temperature range of the catalyst by influencing the flow rate of the medium flowing through the heat transfer surfaces preceding the catalyst section 18. The stabilization of the gas temperature is important. If the temperature of the gas entering the catalyst section 18 decreases substantially more than 25° C. from the optimum working temperature of the catalyst, the reduction of nitrogen oxides is radically decreased. On the, other hand, if the temperature is too high, a side reaction of $SO_2$ oxidizing to $SO_3$ may occur, causing corrosive condensation later on in the process.

As illustrated in dotted line in FIG. 1 one or more catalyst sections 18' may be disposed before the economizer surfaces 14 if the catalyst is selected so that its optimum working temperature is above 400° C., e.g., about 500° C. It is also possible to position the catalyst section 18' between the economizer surfaces 14 if the temperature requirements are such that this location is in order. The present invention makes it possible to readily select the proper location in the convection section 10 of the catalyst sections 18, 18' and still provide the temperature within the desired range.

Under some operating conditions, such as a low load condition, there may be an excess of injected ammonia after the first reduction stage. In such cases the second reduction stage, while reducing the nitrogen oxide emissions, simultaneously removes the gaseous $NH_3$ slip from the gases. This makes the present invention with two reducing stages even more attractive, due to its ability to provide a safe method of running the fluidized bed steam generator even at low loads.

As a precautionary measure, the second reduction stage in the convection section 10 may be provided with an additional reducing agent injection nozzle 20 upstream of the catalyst section 18, 18'. The additional reducing agent introduction nozzle 20 may operate only in response to temporary aberrant conditions in the first reduction stage e.g., if a blockage occurs at the reducing agent injection nozzles.

While circulating fluidized bed combustion has been described herein as a preferred embodiment, it should be understood that the present invention may be applied to various processes. For example, the convection section 10 may be disposed in association with, e.g., a black liquor recovery boiler. It can also be associated with a waste heat boiler of a process in which thermic $NO_x$ is produced in the flue gases, in which case the convection section may be disposed in a horizontal position.

The present invention may utilize the already existing sootblower system for heat exchangers in the convection section 10. The catalyst sections 18, 18' may be maintained clean by using the sootblowers provided for the heat transfer surfaces in the convection section 10. In case the catalyst sections 18, 18' require their own sootblowers, the utilization of the sootblower system of the heat transfer surfaces in the convection section 10 may still be utilized.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A steam generation boiler system comprising:

a fuel reaction chamber, introducing means for introducing into flue gases in said reaction chamber a reducing agent for reducing nitrogen oxides;

a flue gas convection section operatively connected to said reaction chamber;

heat transfer elements, including heating surfaces, and at least one economizer having water as a heat transfer medium, disposed in said convection section for extracting heat from the flue gases;

a catalytic treatment element provided in said convection section downstream of said economizer and comprising a catalyst for effecting catalytic reduction of nitrogen oxides; and means for controlling the flow rate of feed water into said economizer so as to control the temperature of the flue gases at said catalytic treatment element so as to provide an optimum working temperature of said catalyst.

2. A steam generation boiler system according to claim 1, wherein said catalytic treatment element comprises a catalyst bed containing said catalyst and having a linear length in the direction of flow of gases through said convection section, and wherein said length of said catalyst bed is less than 2 meters.

3. A steam generation boiler system according to claim 2, wherein the length of said catalyst bed is less than 1 meter.

4. A steam generation boiler system according to claim 1, wherein said reaction chamber comprises a fluidized bed combustor, and further comprising a particle separator between said reaction chamber and said catalytic treatment element.

5. A steam generation boiler system according to claim 1, wherein said introducing means for introducing reducing agent into the flue gases in said reaction chamber is located upstream of said economizer.

6. A steam generation boiler system according to claim 1, wherein said introducing means for introducing reducing agent into the flue gases in said reaction chamber is located upstream of said heating surfaces, said catalytic treatment element in said convection section being located downstream of said introducing means and said heating surfaces.

7. A steam generation boiler system as recited in claim 1 wherein said heating surfaces comprise one or more reheaters.

8. A steam generation boiler system as recited in claim 1 wherein said heating surfaces comprise one or more superheaters.

9. A steam generation boiler system comprising:

a circulating fluidized bed reactor having a combustion chamber, a flue gas convection section operatively connected to said combustion chamber, and a cyclone separator between said chamber and said flue gas convection section;

heat transfer elements, including heating surfaces, and at least one economizer having water as a heat transfer medium, disposed in said convection section for extracting heat from the flue gases and for heating heat transfer media;

means for introducing reducing agent into flue gases in said circulating fluidized bed reactor upstream of said heating transfer elements;

a catalytic nitrogen oxide reducing element comprising a catalyst for effecting catalytic reduction of nitrogen oxides provided in said convection section located downstream of said introducing means and said heating surfaces, and upstream of said economizer; and means for controlling the flow rate of heat transfer medium in at least one of said heat transfer elements so as, to control the temperature of the flue gases at said catalytic nitrogen oxide reducing element so as to provide an optimum working temperature of said catalyst.

10. A steam generation boiler system according to claim 9, wherein said catalytic nitrogen oxide reducing element comprises a catalyst bed containing said catalyst and having a linear length in the direction of flow of the gases through said convection section, and wherein said length of said catalyst bed is less than 2 meters.

11. A steam generation boiler system as recited in claim 9 wherein said heating surfaces comprise one or more reheaters.

12. A steam generation boiler system as recited in claim 9 wherein said heating surfaces comprise one or more superheaters.

* * * * *